United States Patent Office 2,826,799
Patented Mar. 18, 1958

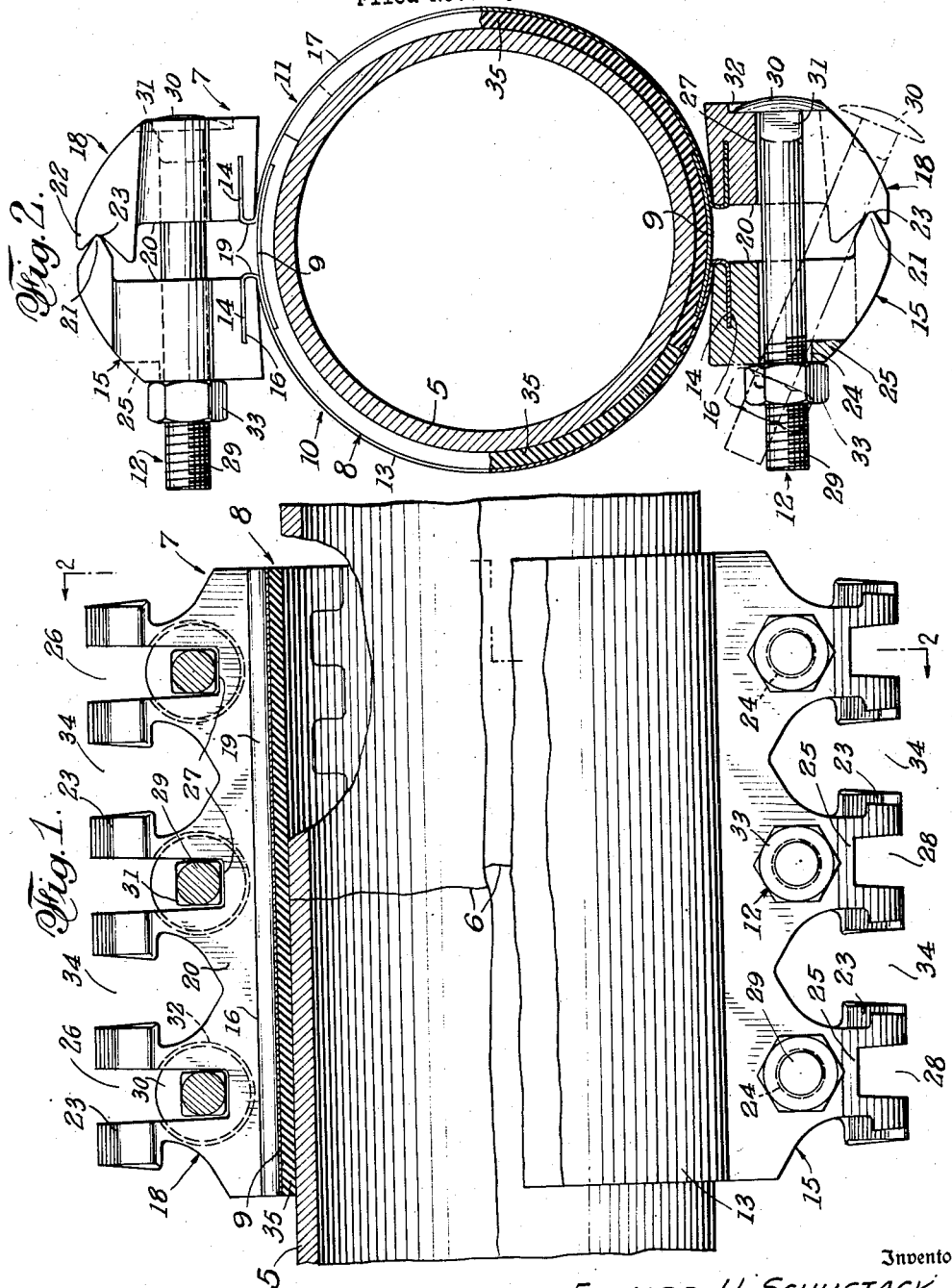

2,826,799

PIPE COUPLING

Edward H. Schustack, Los Angeles, Calif.

Application November 9, 1953, Serial No. 390,817

5 Claims. (Cl. 24—279)

This invention relates to a coupling or clamp for connecting the adjacent ends of two aligned pipes, connecting the fractured ends of a pipe, or sealing a leak in a pipe, as the case may be. The latter two cases are emergency repair conditions. Therefore, it is an object of the present invention to provide a novel pipe coupling that, with easy facility, may be applied to effectively seal a leak in a pipe.

Inasmuch as couplings of the present type are frequently installed in operative position in cramped or close quarters and, generally, under adverse working conditions, it is a further object of the invention to provide a two-part coupling or clamp in which the clamp bolts that connect the coupling halves may be carried by one half and readily placed in position to engage the other half while the two halves are in encircling position around a pipe, thereby greatly facilitating installation of the coupling.

Another object of the invention is to provide a pipe coupling, as above indicated, in which the clamp halves cooperate, under forces applied by connecting bolts, to draw tightly around a pipe without subjecting said bolts to bending that may result in a lessening of their strength.

A further object of the invention is to provide the halves of a two-part coupling clamp with lugs that have fulcruming engagement outside of the place of application of the connecting bolts, whereby the latter have a power advantage to draw the clamps tightly in encircling engagement with a pipe.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a partial elevational and partial longitudinal sectional view of a pipe coupling according to the present invention, the same being shown as connecting the ends of a pipe or conduit having a fracture therein to seal said fracture.

Fig. 2 is a cross-sectional view as taken on line 2—2 of Fig. 1.

In the drawing, pipe 5 is representative of the adjacent ends of two aligned pipes or conduits, a pipe having a fault that results in leakage, or one, as shown, that has a fracture 6. The present coupling is shown in position to seal around pipe 5 under any of the three stated conditions.

The coupling that is illustrated comprises, generally, a two-part clamp 7, a gasket liner 8 within the clamp and around the pipe, a pair of metal shoes 9 to span across the gaps between the clamp parts 10 and 11, and a set of bolts 12 to connect said clamp parts. Although the clamp is shown as comprised of two parts 10 and 11, three or more parts may be used.

The clamp part 10 comprises a sheet metal sleeve half 13 that is preferably cylindrically curved to conform to and be somewhat larger in diameter than the outer diameter of pipe 5. The opposite edges of said sleeve half 13 are doubled back to provide laterally directed flanges 14. Said sleeve half is advantageously made of a corrosion-resistant metal sheet, such as copper, and the same, therefore, is readily conformable to pipe 5 and to variations in the diametral symmetry of said pipe.

At the edges of said sleeve half 10 there are provided similar substantially rigid lugs 15 that are substantially coextensive in length with the length of sleeve half 13. The mentioned doubled back flanges 14 of the latter reside in slots 16 formed in said lugs 15. Unless high corrosion resistance is desired, in which case a metal such as bronze or brass may be used, the lugs are advantageously made of cast iron.

The clamp part 11 comprises a sleeve half 17 that is similar to and is the complement of sleeve half 13, the same having doubled back flanges 14 similar to those above described. At the opposite edges of sleeve half 17 are provided lugs 18 that are opposite lugs 15 of clamp part 10 and connect to flanges 14 of sleeve half 17 in the manner above described.

It will be seen from Fig. 2 that the lines of bend 19 defined between the sleeve halves 13 and 17 and their respective flanges 14 are spaced when the clamp is applied and that lugs 15 and 18, arranged in cooperating pairs, are similarly spaced as to their faces 20.

The lugs 15 are each provided, at their outer ends, with respect to their connection with sleeve half 13, with a laterally directed projection 21 which is preferably formed to have an edge of acute angle form so as to constitute a fulcrum line or edge. Said projection extends from face 20 of each lug 15. The lugs 18 are each provided at their outer ends with a comparable laterally directed projection 22 which is formed to have a seat 23 against which projection 21 engages. Each seat is defined by angularly related walls that include an angle greater than the acute angle of projections 21. Thus, a certain amount of rocking of one lug relative to the other lug of each pair is possible by the pivotal engagement of the projections 21 and seats 23 of the pairs of lugs.

Each lug 15, between slot 16 and projection 21, is provided with a clearance hole 24 for each bolt 12 of the set used to connect the clamp parts. As best seen in Fig. 2, each hole 24 is formed in a relatively thin wall 25 that defines the outer lateral face of the lug. Consequently, as shown by the dot-dash lines of said figure, the bolts may be angularly swung from their normal position when connecting the clamp parts to be substantially clear of the lug 18 opposite to the lug that carries the bolts.

In alignment with each said hole 24, each lug 18 is provided with a slot 26 that opens on the outer end of lug 18. The base wall 27 of each said slot is flat and substantially normal to the side walls thereof. Except for wall 25, lug 15 is provided with similar slots 28 which, thereby, are aligned with slots 26 to provide guides for bolts 12 into and out of operative position. As seen in Fig. 1, these slots 26 and 28 may be tapered to facilitate connection of the bolts with lugs 18.

Each bolt 12 is formed as a carriage bolt to have a threaded shank 29, a flat head 30, and a square portion 31 adjacent said head. A seat 32 is provided in the outer face of each lug 18 for each bolt head and the square portion 31, by engagement in slot 26, holds said bolts against rotation. A nut 33 is provided on each shank and is engaged with the outer faces of lugs 15.

In clamps that have more than one bolt in each side of the pipe being encircled, it is preferred to provide bifurcations 34 in the lugs 15 and 18 between the portions engaged by the bolts so that said lugs are lightened in weight without loss of strength.

The gasket liner 8 is interposed between the pipe and the clamp halves 13 and 17 and is here shown as two interfitting rubber members 35 that serve to seal around a joint or fracture 6 in pipe 5. The shoes 9 are sheet metal members that span the gaps between the clamp parts and are placed over the gasket liner as shown.

When applying the present clamp, particularly in close quarters, the part 10 which carries the bolts 12 is placed against one side of the pipe with the gasket liner in position. The nuts 33 are backed off so that the bolt heads 30 thereof may be clear of lugs 18 when the clamp part 11 is placed on the opposite side of the pipe. Such placement of part 11 is facilitated by the ability to swing the bolts angularly upward or downward, as the case may be. Now, it is a simple matter to swing the bolts to bring the square portions thereof into position against the bottoms of slots 26 and, by using the fingers, spin nuts 33 up on shanks 29 to draw the bolt heads 30 into their respective seats 32. Whether or not, at this time, the projections 21 are engaged with seats 23 is immaterial since, by drawing the nuts 33 tight, such engagement is achieved first and then constitutes fulcrum points on which the lugs mutually pivot toward each other as the sleeve halves 13 and 17 are drawn tautly around the gasket-lined pipe.

In the above manner, endwise application of the bolts is obviated which is an important factor, particularly in confined places, as in excavations and the like.

It will be evident that the above-described coupling or clamp structure may be varied by omitting one set of lugs and making the sheet metal sleeve in the form of an encircling element that has connection to the set of lugs that is used. In this disclosure, the terms "coupling" and "clamp" are intended as synonymous.

While I have illustrated and described what I now contemplate to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what I claim and desire to be secured by Letters Patent is:

1. A pipe patch or clamp comprising a pair of flexible metallic sleeves adapted to be placed around a pipe, each sleeve having a pair of draw-hooks formed by bent-over longitudinal edges of said sleeve, two pairs of rigid draw-blocks having slits in which the draw-hooks of each sleeve are engaged, the circumferential extent of the two sleeves being slightly less than the circumference of the pipe so that when the sleeves are placed around the pipe there will be gaps between the respective hooks and the blocks connected to the hooks, each pair of blocks being provided with a pair of arms extending radially of the sleeves, said arms being each provided with an outer end and said ends being bent over toward each other to bridge the mentioned gaps, one of said bent ends of each pair having a V-shaped pivot point and the other bent end being provided with a V-shaped seat in sliding engagement with the V-shaped pivot point when said arms are moved into engagement with each other, a bolt extending through each pair of blocks, each of said bolts extending through a hole in one block and a slot in the other block and, upon being tightened, bringing the blocks together to cause them to pivot, and thereby, tighten the sleeves around the pipe.

2. A pipe patch or clamp according to claim 1 in which the bolts have polygonal heads, and the slot in the one block has polygonal sides, the bolt head engaging the sides and thereby being held against rotation.

3. In a pipe patch or clamp adapted to tighten a pair of sleeves around a pipe, the improvement comprising a pair of rigid clamp blocks engaging said sleeves, one clamp block having a hole therein and the other clamp block having an open slot therein with spaced sides, and a bolt in said hole and slot and having a polygonal head extending through said clamp blocks and adapted to draw the same together, the head of said bolt engaging the sides of said slot to be held against rotation when the bolt is tightened, said clamp blocks being provided with inter-engaged outer ends and the end of the block having the slot being bifurcated by said slot.

4. A pipe clamp or coupling comprising first and second flexible metallic sleeve members terminating in bent-over edges constituting hooks, the adjacent hooks of said first and second sleeve members being spaced from each other to form a gap when said members are placed around a pipe, first and second pairs of rigid draw-blocks engaging said hooks, each block having an arm extending radially of the pipe, and the adjacent arms of each pair of blocks being provided with inwardly bent ends, one bent end having a V-shaped pivot point directed toward the other bent end and said other bent end being provided with a V-shaped seat in which the pivot point is engaged when the arms of the respective pairs of blocks are brought into engagement with each other, one block of each pair having a through hole located between its bent end and the bent-over hooks of the sleeve members, the other block of each pair being provided with a through slot that bifurcates the bent end thereof, and a bolt extending through the hole and slot of each pair of blocks to bring the blocks together and thereby tighten the sleeve members around the pipe, each bolt having a head and being provided with a non-round portion adjacent the head, and the mentioned slot being aligned with each respective hole and being formed to conform to said non-round portion of the bolt to hold the latter against rotation during tightening of the clamp.

5. In a pipe patch or clamp according to claim 3, the inter-engaged ends being directed toward each other, one said end having a V-shaped pivot point and the other end having a V-shaped seat in which said point is engaged, said pair of arms thereby being in sliding engagement with each other when the bolt is tightened to guide the blocks into opposed alignment when drawn together by the bolt.

References Cited in the file of this patent

UNITED STATES PATENTS

| | | |
|---|---|---|
| 172,669 | Stevens | Jan. 25, 1876 |
| 1,468,110 | Howe | Sept. 18, 1923 |
| 1,596,944 | Philbrook | Aug. 24, 1926 |
| 1,618,234 | Skinner | Feb. 22, 1927 |
| 2,042,263 | La Valley | May 26, 1936 |
| 2,175,712 | Westermayer | Oct. 10, 1939 |
| 2,222,289 | Fordon | Nov. 19, 1940 |
| 2,599,882 | Adams | June 10, 1952 |
| 2,713,352 | Schustack | July 19, 1955 |